Aug. 16, 1966  A. T. SPEES  3,266,965
METHOD OF MAKING A TEARABLE LAMINATED SHEET MATERIAL
Filed March 26, 1964  3 Sheets-Sheet 1

INVENTOR.
BY ARTHUR T. SPEES
Mason & Graham

INVENTOR.
ARTHUR T. SPEES
BY
Mason & Graham

Aug. 16, 1966   A. T. SPEES   3,266,965
METHOD OF MAKING A TEARABLE LAMINATED SHEET MATERIAL
Filed March 26, 1964   3 Sheets-Sheet 3

INVENTOR.
ARTHUR T. SPEES
BY
Mason & Graham

United States Patent Office 3,266,965
Patented August 16, 1966

1

3,266,965
METHOD OF MAKING A TEARABLE LAMINATED SHEET MATERIAL
Arthur T. Spees, 633 S. Carondelet St., Los Angeles, Calif.
Filed Mar. 26, 1964, Ser. No. 355,053
11 Claims. (Cl. 156—152)

This invention has to do generally with a method for making means for effectively tearing thermoplastic sheet material along a predetermined line without the aid of any implement and also with the construction of tearable sheets and easily openable packages.

This application is a continuation-in-part of my copending application on Tearable Sheet Construction, Serial No. 54,471, filed September 7, 1960, now Patent No. 3,127,087. The latter is a continuation-in-part of Patents No. 2,952,395 and No. 2,991,000, and reference is made thereto for a discussion of the use of thermoplastic materials in packaging, and the desirability of having incorporated therein an effective means whereby a package or container of such material can be readily opened in a predetermined region by a simple tearing action.

An object of the invention is to provide a novel method of making tear tape means for use in conjunction with thermoplastic sheet material, whether the material be a single sheet or be a composite laminated sheet consisting of thermoplastic material and non-thermoplastic material.

A further object is to provide a novel method of making a unique form of tear tape which is suitable for application to thermoplastic sheet material, and to provide such a method which can be used in conjunction with the application of the tape itself to the sheet material.

A still further object is to provide a method of making a package or container embodying novel means for enabling a person to readily open the package along a predetermined line or region.

A further object in this connection is to provide novel forms of container construction.

Another object is to provide novel tearable constructions in a sheet material comprised in part at least of thermoplastic material.

These and other objects will be apparent from the drawings and the description which follows. Referring to the drawings.

Figure 1:
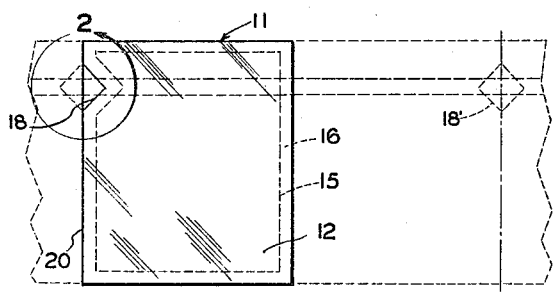
FIG. 1 is a front face view of a bag-type container embodying a tape made by the method of the invention.
Figures 4A, 5A:
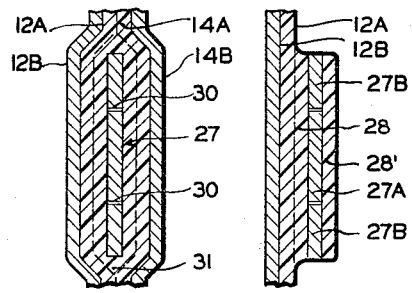
Figure 2:
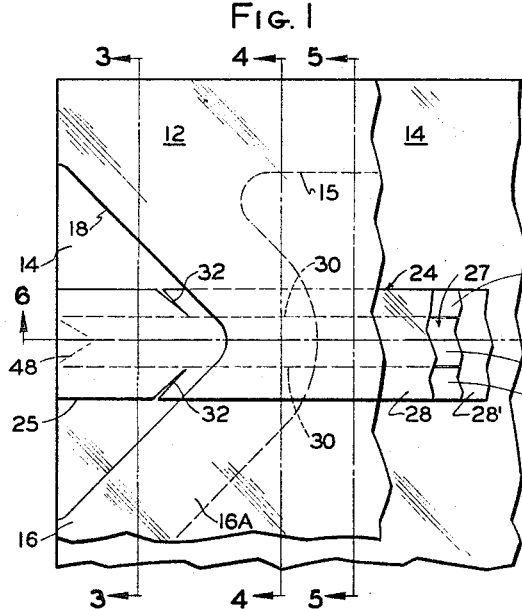
FIG. 2 is an enlarged face view of the upper arrow-encircled corner portion of the container of FIG. 1.
Figures 3, 4, 5:
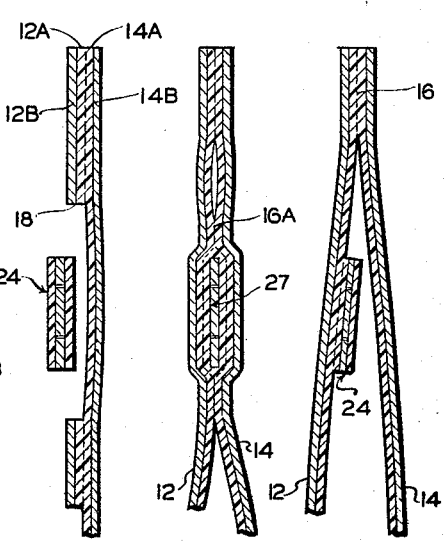
Figure 6:
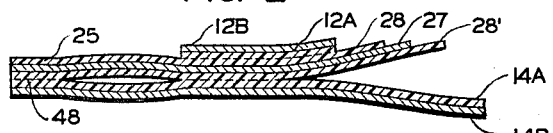
Figure 8:
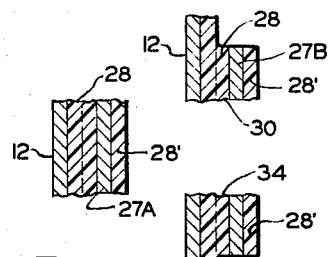
Figure 7:
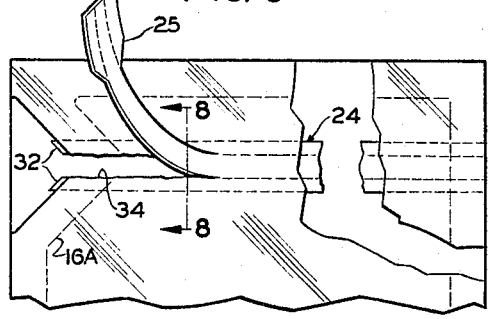
Figure 9:
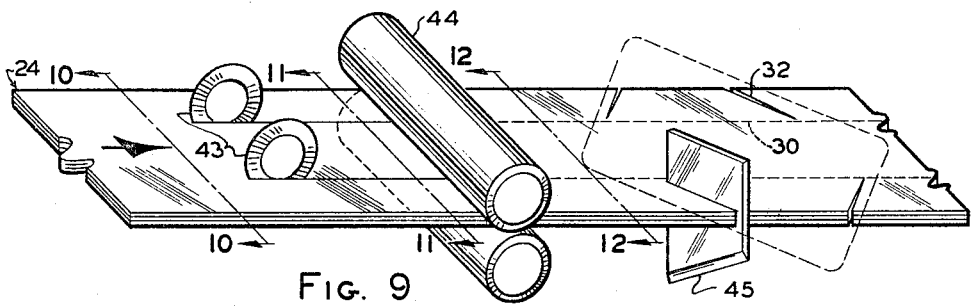
Figure 10:
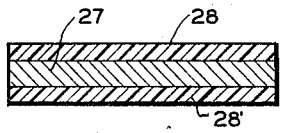
Figure 11:
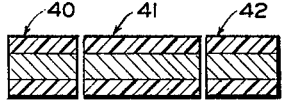
Figure 12:
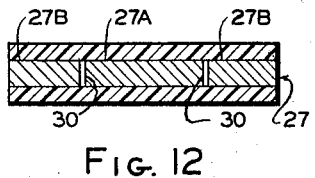
Figure 13:
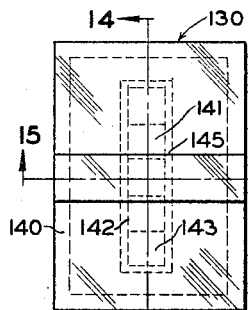
Figure 14:
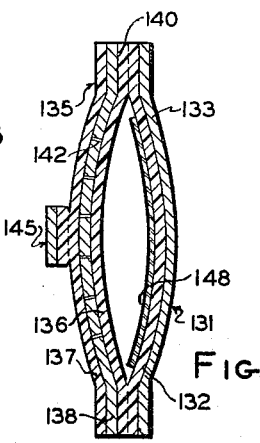
Figure 15:
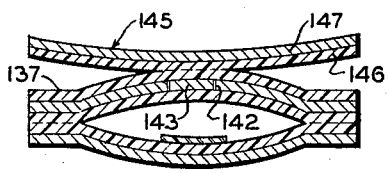
Figure 16:
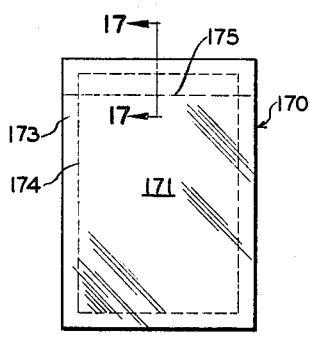

FIGS. 3, 4, 5, and 6 are sectional views on lines 3—3, 4—4, 5—5, and 6—6, respectively, of FIG. 2;

FIG. 4a is an enlarged fragmentary view of the central portion of the showing in FIG. 4;

FIG. 5a is an enlarged fragmentary view of the central portion of the showing in FIG. 5;

FIG. 7 is a faceview, partly broken away, of the upper portion of the container of FIG. 1, showing the tear tape partially severed;

FIG. 8 is a greatly enlarged fragmentary sectional view on line 8—8 of FIG. 7;

FIG. 9 is a diagrammatic view illustrating one method of making a tear tape;

FIGS. 10, 11, and 12 are sectional views on lines 10—10, 11—11, and 12—12, respectively, of FIG. 9, the views being enlarged for clarity with respect to the thickness dimension of the tape;

FIG. 13 is a plan view of a pouch or bag-type container embodying a modified construction;

FIGS. 14 and 15 are sectional views on lines 14—14 and 15—15, respectively, of FIG. 13, but on a larger scale and with the thickness of the material exaggerated;

FIG. 16 is a plan or face view of a bag-type container illustrating another form of the invention;

2

Figure 17:
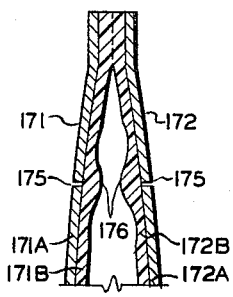
Figure 18:
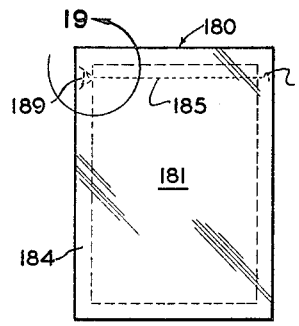
Figure 19:
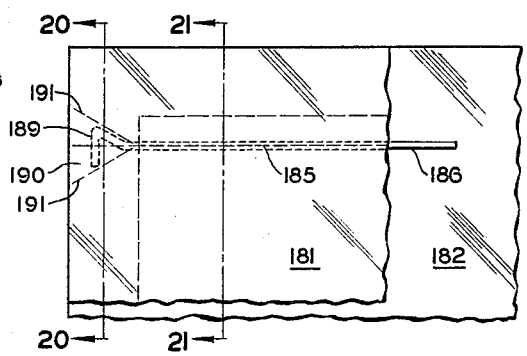
Figures 20, 21, 22:
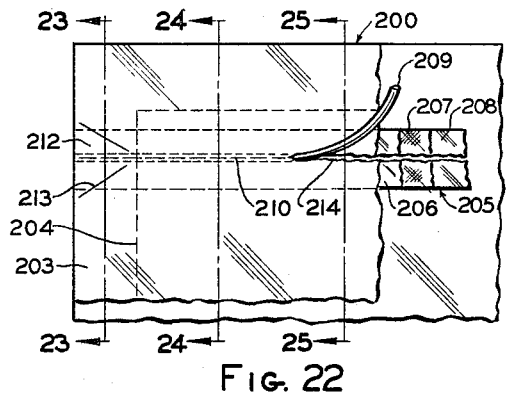
Figures 23, 24, 25:
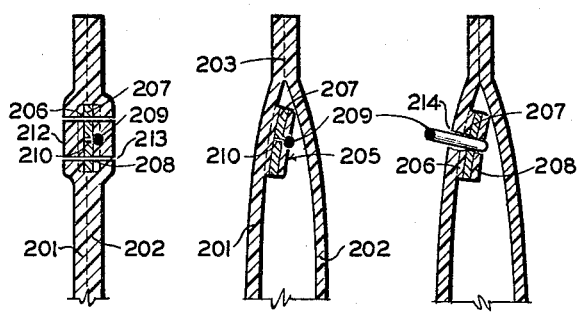

FIG. 17 is a fragmentary sectional view on line 17—17 of FIG. 16;
FIG. 18 is a view similar to FIG. 16, but showing still another form of the invention;
FIG. 19 is a fragmentary enlarged detail face view of the arrow-encircled portion of FIG. 18;
FIG. 20 is a section on line 20—20 of FIG. 19;
FIG. 21 is a section on line 21—21 of FIG. 19;
FIG. 22 is a view similar to FIG. 19 but showing an alternate construction;
FIG. 23 is a section on line 23—23 of FIG. 22;
FIG. 24 is a section on line 24—24 of FIG. 22; and
FIG. 25 is a section on line 25—25 of FIG. 22.

More particularly describing the invention, in FIGS. 1–8 I show a container 11 comprising a front sheet 12 and a rear sheet 14, each consisting of two layers of material forming a laminated construction in which the inner layer is a thermoplastic material, such as polyethylene, and the outer layer a non-thermoplastic material. Numerals 12A and 14A designate the inner layer of sheets 12 and 14, respectively, while numerals 12B and 14B, the outer layers.

The container 11 is sealed around its margins in the region outwardly of the broken line 15 in FIG. 1 by the application of heat and pressure, whereby the two inner layers 12A and 14A of the two sheets 12 and 14 are united in such region, designated 16.

In FIGS. 1 and 2 I show a front sheet 12 of the container with a V-shaped cutout portion or recess 18 which may be formed in any suitable manner.

To provide means for readily and effectively opening the forward sheet 12 of the container, I provide a laminated tear strip 24. This is united with the inner side of sheet 12 and extends to project into the area of recess 18, providing a pull-tab portion 25. The tear tape is formed of an inner core or layer of a flexible, relatively strong, stretch-resistant, non-thermoplastic material, designated 27 and outer covering layers 28 and 28' of a thermoplastic material which may be the same as the material of layer 12A of sheet 12, or may be another material compatible therewith.

In the form of the invention shown in FIGS. 1 to 12 the core or inner layer 27 of the tape is shown divided into three sections, namely, an inner or central section 27a and marginal sections 27b. These are separated by slits or lines of parting 30 extending longitudinally of the tape. The tape 24 is applied to the inner surface of the sheet 12 by the application of heat and pressure, whereby the tape is thereby actually united with the thermoplastic inner layer 12a of sheet 12. In the region of the recess 18, the marginal sealing area 16 follows the outline of the recess 18, providing a sealed area 16a, and when the bag or container is sealed or formed in this region the tear tape 24 is sealed to and united with both the inner and outer sheets 12 and 14 so that a hermetically sealed joint is achieved in the region where the tape passes through the container to the outside thereof. At its other end the tape is also sealed between the sheets 12 and 14 in the sealed area 16.

In FIG. 2 the tab portion 25 of the tape is shown provided with a pair of inclined slits 32, which cut through the outer marginal portions of the tape substantially to the slits 30. Consequently, when the tab 25 is grasped and pulled forwardly and to the right, as shown in FIG. 7, the tape readily begins to part or tear along the silts 30 inwardly of the slits 32 and carries with it the overlying portion of the front sheet 12, providing a slot 34 in the front of the container. It will be apparent that in the tearing operation the portions of sheet 12 bordering slot 34 are strongly reinforced against stretching and tearing by the two marginal portions 27B and 27B of the tear tape 24, which remain secured to the sheet 12. Since the inner core or layer 27 is much stronger than the front sheet 12, the latter readily gives way and is precisely torn as the tear tape is pulled.

While it is not essential that I utilize a tear tape such as that designated 24 having the slits 30 and the inner layer or core, and in lieu thereof may use a tape which is merely scored or in which the core is so woven or processed at the time of manufacture that it has a tendency to tear readily longitudinally as opposed to other directions, I prefer to use the construction previously outlined and in FIGS. 9–12 I show a simple method of making such a tape. Referring to these figures, in FIG. 9 I show the tape 24 which may be assumed to be traveling during processing in the direction of the arrow shown thereon. The tape is originally formed of three layers, namely, the inner layer 27 of flexible, non-thermoplastic, substantially non-stretchable, relatively strong material, and the two outer layers of thermoplastic material, those being designated 28 and 28'. The three layers are laminated by any conventional process by which this is done in the art. As the tape proceeds in the direction of the arrow it is slit into three longitudinally extending strips designated 40, 41, and 42, as by means of cutters 43. Subsequently, heated rollers 44, or other means is used to apply heat and pressure, thereby reuniting the segments of the outer layers as best shown in FIG. 12 so that only the core or inner layer 27 is left divided into its three component strips 27A, 27B and 27B. After the outer layers of the tape have been reunited over the slits 30, fully enclosing and sealing the slitted areas, the resulting tape is applied to the sheet material 12 by heat and pressure and across the center of opening 18'. The tape is then cut, as by knives 45, to produce the slits 32 previously referred to. Following this, the rear sheet 14 is brought into place behind the front sheet 12 and the two united or sealed together in the aforementioned regions 16 and 16A, the rear surface or layer of the tape being sealed to sheet 14 in the region 16A and at the other end thereof.

In FIGS. 13–15 I show another application of the principles underlying the invention. In these figures numeral 130 designates a pouch or bag-type package comprising one wall formed of a sheet 131 comprising an inner layer of thermoplastic material 132 and an outer layer of non-thermoplastic material 133 together with a second wall comprising a sheet 135 having inner and outer layers 136 and 137, respectively, of thermoplastic material and an intermediate layer 138 of non-thermoplastic material. The package is closed by a marginal heat-sealed region 140. In a central area designated 141 I provide a plurality of slits 142 which, for convenience, are shown as defining a plurality of rectangular areas 143. The slits in the intermediate layer can best be made by cutting the entire sheet material through all three layers and subsequently restoring the inner and outer layers by application of heat and pressure. I then provide a tear strip 145 consisting of an inner layer 146 of a thermoplastic material which is united by heat and pressure to the layer 137 directly over any one of the areas 143. The inner side of sheet 131 may be provided with a non-thermoplastic barrier 148 to facilitate application of the strip 145 and prevent unwanted sealing of the inner surfaces of the two opposed walls of the package should the strip be applied after the package is formed. When strip 145 is pulled, sections of the inner and outer layers 136 and 137 and a section 143 of the intermediate layer are torn as a unit from the package. By providing a plurality of sections 143, it is an easy matter to apply the tear strip 145 without requiring care to insure registration.

In my application Serial No. 54,471 I show a tearable bag or package construction generally similar to that shown in FIGS. 16 and 17. Referring to those figures, a bag 170 having a front wall 171 and a back wall 172 sealed together at their margins in the area 173 outward of the broken line 174 is illustrated. The walls are of laminate sheet material and the front wall has an outer layer 171A of a non-thermoplastic material and an inner layer 171B of a thermoplastic material. Similarly the other wall has an outer non-thermoplastic layer 172A and an inner thermoplastic layer 172B. Each of the outer layers of the two walls is shown scored or perforated at 175 along a given line to provide a line of tear. While this provides a satisfactory construction for many applications, there are occasions where added strength may be desirable along the tear line, and this can be achieved by increasing the thickness of the thermoplastic layer behind the perforations of the outer layer of the sheet. Thus, the inner layer of material in the case of each wall is shown provided with a thickened portion 176 behind the line of perforations 175 of the outer layers. This thickened area may be provided by displacing some of the material from the sheet by the application of heat and pressure or it may be formed by the addition of material at this region. In either case the inner laminate is strengthened against inadvertent rupture and against passage of liquid or gas at this region to compensate for the weakening of the outer layer. The increased thickness in the region 176, however, does not prevent or interfere with the tearing of the material along the perforated or scored line 175.

The method of forming the slits or perforations 175 in each sheet consists of perforating (or slitting if desired) the sheet completely through both layers of the laminate and subsequently closing the perforations (or slits) in the thermoplastic layer by application of heat and pressure, some of the material of the thermoplastic sheet being displaced laterally to provide the thickened section. This is essentially the same as the method employed in making the tear tape previously described and it will be appreciated that the method makes it possible to control the thickness of the thermoplastic sheet at the tear line, that is, make this dimension greater as shown herein or lesser as shown in the application, Serial No. 54,471, and Patent No. 2,952,395.

Referring now to FIGS. 18–21, I show the application of a tear string to a bag in a manner such that the tear string is completely sealed within the bag and the construction therefore presents no sealing problem such as occurs where a tear string is brought from the inside of the bag to the outside thereof as in conventional constructions. In these figures, numeral 180 generally designates a bag-like container with a front wall 181 having an outer non-thermoplastic layer 181A and an inner thermoplastic layer 181B and a back wall 182 with layers 182A and 182B which correspond to the layers of the front wall. The two walls are joined together in the margin 184 by application of heat and pressure. The front sheet 181 is shown provided with perforations 185 which extend just through the outer layer 181A thereof. Behind these and joined to the inner surface of the inner layer is a tear string 186 of any suitable material. The string terminates at one end, 188, sealed within the marginal sealed area 184 of the package, and, at its other end, designated 189, the string is sealed within the opposite margin or sealed area of the package. The end 189 is located in a section 190 defined by two converging lines of perforations 191 which extend through both the front and back sheets of the bag. Thus in the use of the device the section 190 becomes a severable pull tab for the tear string which can readily be separated from the remainder of the package to cause the string to tear through the front wall directly along the line of perforations 185. The ends of the string being originally sealed within the side seams of the package eliminates any possibility of weakness or unsealed portion as along the edges of a string that is brought to the exterior of the package as in conventional constructions.

While I prefer to utilize the perforate or weakened line (185) construction shown in FIGS. 19–21, there are cases where this is not essential, and in its broader aspects the invention resides in the provision of the tear string with it ends sealed into the margins of the package and with some suitable means for pulling at least one end of the string as by the pull tab 190.

Referring now to FIGS. 22–25, I show an alternate construction for tearing open a package 200 along a predetermined line, the package having a front wall 201 and a back wall 202, both of a synthetic resin-type thermoplastic material. The walls are sealed together at their margins in the area 203 outwardly of the broken line 204. In this case I show a combined tear tape and string 205 which comprises one layer 206 of thermoplastic material which is heat-welded or joined to the inner surface of the wall 201, an intermediate non-thermoplastic and relatively non-stretchable layer 207 and a strip 208 of thermoplastic material. Joined to the latter and partially embedded therein is a tear string 209 of any suitable material 209. This may be a plastics, metal, twine gut, or the like. The intermediate strip 207 is provided with a line of weakness such as perforations 210 directly in line with the tear string.

The assembly 205 is therefore similar to the tear tape previously described except here the tear string rather than a section of the tear tape is used to effect the tearing operation. By pulling the string through the line of perforations 210 and through the front wall 201 of the package, which may be accomplished by providing a tab section 212 at the margins of the package defined by slits 213, the package is readily opened. In FIG. 22 it may be assumed that a similar tab 212 has been provided at the opposite margin of the package and that this has been pulled to cause the string to form a tear line or opening 214 in the package.

It will be seen that the intermediate layer 207 of the assembly 205 serves to reinforce the material of the wall 201 at each side of the proposed line of tear, thereby enabling the tear strip to pull through and tear the material which otherwise would stretch and either fail to tear or tear improperly. It will be apparent that the tear tape string assembly 205 also may be used upon a laminate type of package where the internal surface of the walls is a thermoplastic material.

Throughout the specification and claims I make reference to the terms "thermoplastic" and "non-thermoplastic." I intend this in a relative sense in that the non-thermoplastic sheet be one which is not usable in the same temperature range as the "thermoplastic" sheet, but might well be fusible at a temperature substantially above the temperature at which the so-called thermoplastic sheet becomes fusible.

Although I have illustrated and described a preferred form of my invention, I contemplate that various changes and modifications can be made therein without departing from the invention, the scope of which is indicated by the following claims.

I claim:

1. The method of forming a tear tape for application to thermoplastic sheet material from a laminated strip having a core layer of non-thermoplastic sheet material between two layers of thermoplastic sheet material, which comprises the steps of weakening said laminated strip longitudinally along at least one line by at least partially severing the laminated strip to define at least two longitudinal sections, and restoring the severed portions of each of the thermoplastic layers of said laminated strip by application of heat while leaving the severed portion of said core layer in severed condition.

2. The method set forth in claim 1 in which said composite strip is initially weakened along two lines defining three longitudinal sections.

3. The method of forming a tear tape for application to thermoplastic sheet material from a laminated strip having a layer of non-thermoplastic sheet material and a layer of thermoplastic sheet material, which comprises the steps of weakening said laminated strip longitudinally along at least one line by at least partially severing the laminated strip completely therethrough along such line to define at least two longitudinal sections, restoring the severed portion of said thermoplastic layer of said composite strip by application of heat while leaving said non-thermoplastic layer severed along said line.

4. The method of forming a tear tape for application to thermoplastic sheet material from a laminated strip having a layer of non-thermoplastic sheet material and a layer of thermoplastic sheet material, which comprises the steps of separating said laminated strip longitudinally along at least one line to define at least two longitudinal sections, restoring the parted portion of said thermoplastic layer of said laminated strip by application of heat while leaving said non-thermoplastic layer parted along said line.

5. The method of providing means for tearing a sheet of material having a thermoplastic surface which comprises providing a laminated strip having a layer of non-thermoplastic sheet material and a layer of thermoplastic sheet material, weakening said laminated strip longitudinally along at least one line by at least partially severing the strip completely therethrough along said line to define at least two longitudinal sections, restoring the weakened-line portion of the thermoplastic layer of said laminated strip by application of heat while leaving the weakened-line portion of said non-thermoplastic layer in weakened condition, and applying the resulting laminated strip to the thermoplastic surface of said sheet by uniting the thermoplastic layer thereof to the thermoplastic surface of said sheet by application of heat.

6. The method set forth in claim 5 in which a pull-tab is provided at one end of one longitudinal section of said non-thermoplastic layer by weakening the laminated strip to define the tab and leaving the tab free of said sheet of material having said thermoplastic surface.

7. The method of forming a tearable line section across a portion of a sheet of material comprising a laminate of at least one thermoplastic layer and one non-thermoplastic layer, which comprises weakening said sheet of material along a desired line by at least partially severing it completely therethrough along said line, and restoring the severed portion of said thermoplastic layer substantially to its original condition by the application of heat and pressure thereto.

8. The method of forming a tearable line section across a portion of a sheet of material comprising a laminate of at least one tough and difficult-to-tear stretchable layer and one relatively non-stretchable layer, which comprises weaking said sheet along a desired line by at least partially severing the sheet completely therethrough along said line, and subsequently restoring said stretchable layer to a non-perforate condition.

9. The method of uniting an element by application of heat and pressure at one side of one of a pair of opposed sheets of thermoplastic material which comprises first inserting a barrier sheet of non-thermoplastic material between the sheets of sufficient size and so located as to prevent fusion of the opposing sides of the sheets when pressed together in a limited portion of their total area, and subsequently applying said element to said one sheet in the presence of heat and pressure.

10. The method set forth in claim 9 in which said sheets are joined to form a container and said barrier sheet is first made a part of one of said sheets.

11. The method of forming a tearable line section across a portion of a sheet of material comprising a laminate of at least one tough and difficult-to-tear stretchable layer of thermoplastic material and one relatively non-stretchable layer of non-thermoplastic material, which comprises weakening said sheet along a desired line by at least partially severing the sheet completely therethrough along said line, and subsequently restoring said stretchable layer by the application of heat and pressure in a manner to cause the material thereof to flow laterally of said line to control the thickness of said stretchable layer in the area along said line.

References Cited by the Examiner
UNITED STATES PATENTS

| | | | |
|---|---|---|---|
| 2,334,381 | 11/1943 | Bronander | 93—1 |
| 2,554,160 | 5/1951 | Von Gunten | 93—1 |
| 2,711,779 | 6/1955 | Carland | 156—251 |
| 2,991,000 | 7/1961 | Spees | 229—51 |
| 3,012,481 | 12/1961 | Hughes | 93—1 |
| 3,127,087 | 3/1964 | Spees | 229—51 |

HAROLD ANSHER, *Primary Examiner.*

GEORGE O. RALSTON, EARL M. BERGERT,
*Examiners.*

M. L. KATZ, *Assistant Examiner.*